United States Patent [19]

Toji et al.

[11] Patent Number: 5,286,115
[45] Date of Patent: Feb. 15, 1994

[54] STUD TYPE TRACK ROLLER BEARING HAVING AN INCREASED SLIDING CONTACT SURFACE

[75] Inventors: Tosio Toji, Kazo; Juichi Amano, Yokohama, both of Japan

[73] Assignee: Nippon Thompson Co., Ltc., Japan

[21] Appl. No.: 887,161

[22] Filed: May 20, 1992

[30] Foreign Application Priority Data

May 24, 1991 [JP] Japan .................. 3-46471[U]

[51] Int. Cl.$^5$ .............................. F16C 21/00
[52] U.S. Cl. ................... 384/127; 384/449; 384/482
[58] Field of Search .......... 384/127, 449, 58, 140, 384/482, 606

[56] References Cited

U.S. PATENT DOCUMENTS 4,384,387  5/1983  Pachuta .................. 384/449
4,581,799  4/1986  Bessinger .............. 384/449
4,938,610  7/1990  Kato ......................... 384/58

Primary Examiner—Lenard A. Footland
Attorney, Agent, or Firm—Skjerven, Morrill, MacPherson, Franklin & Friel

[57] ABSTRACT

A stud type track roller bearing includes a shaft provided with a flange, an annular side plate located in an opposed relationship and fixedly attached to the shaft, a ring fitted onto the flange, a plurality of rollers interposed between the ring and the shaft, a sliding member interposed between the ring and the flange and also between the ring and the side plate, a retainer for retaining the rollers in position. The ring has a pair of opposite flat end surfaces, all of which provide a sliding contact surface. The rollers mainly serve to support the load in the radial direction and the sliding members mainly serve to support the load in the axial direction.

2 Claims, 2 Drawing Sheets

STUD TYPE TRACK ROLLER BEARING HAVING AN INCREASED SLIDING CONTACT SURFACE

BACKGROUND OF THE INVENTION

1. Field of the Invention

This invention generally relates to a roller bearing, and, in particular, to a stud type track roller bearing for use in rolling along a guide path of a cam or a straight path of a guide rail.

2. Description of the Prior Art

A stud type track roller bearing is well known in the art and it is also referred to as a cam follower. A stud type roller bearing generally includes a shaft (stud) having a flange at one end, a ring fitted onto the shaft, a plurality of rollers interposed between the shaft and the ring, a retainer for retaining the rollers in position, and a side plate tightly fitted onto the shaft in an opposed relationship with the flange to keep the ring and the rollers in position. In this conventional stud type track roller bearing, when a thrust is produced in the ring because the rollers are skewed, a side wall of the ring is brought into a sliding contact with either the flange or the side plate so that the thrust is absorbed through such a physical contact between the ring and either one of the flange or the side plate. However, if the thrust is relatively large, a significant heat can be produced through such a physical contact, and, as a result, sticking due to burning could result at such a sliding contact. Thus, the bearing could become stuck due to heating in a relatively short period of time under relatively severe conditions, such as the mounting errors are relatively large, the rotating speed is relatively high, and/or the load is relatively large.

In order to cope with the above-described situation, there has been proposed a stud type track roller bearing employing a special thrust washer as disclosed in the Japanese Utility Model Application No. 2-47417 assigned to the assignee of this application. The roller bearing disclosed in this U.M. application is schematically shown in FIGS. 3 and 4 of this application. As shown in FIGS. 3 and 4, this stud type track roller bearing generally includes a ring 11, a shaft or stud 13, a plurality of rollers 12, a retainer 14, a thrust washer 15 and a side plate 16.

The ring 11 has a relatively large thickness and a guide surface 11a is defined along its inner peripheral surface. In addition, a recessed portion 11b having a diameter larger than the inner diameter of the ring 11 is formed on both sides of the ring 11. The shaft 13 is also provided with a guide surface 13a in an opposed relationship with the guide surface 11a of the ring 11. The shaft 13 is, moreover, provided at its one end with a flange 13c having a diameter slightly smaller than the diameter of the recessed portion 11b, so that the flange 13c may be located inside a corresponding recessed portion 11b. The shaft 13 is also provided with a threaded section 13b at the other end for coupling with another element.

When the shaft 13 is fitted into the ring 11, a gap is created between the guide surface 11a of the ring 11 and the opposed guide surface 13a of the shaft 13, and a plurality of rollers 12 are disposed in this gap circumferentially and spaced apart from each other in rolling contact with both of these guide surfaces 11a and 13a. The retainer 14 is also disposed in this gap so as to keep the rollers 12 in position and spaced apart from each other. The side plate 16 having a center hole is tightly fitted onto the shaft 13, for example, through an interference fit and located adjacent to one side of the guide surface 13a in an opposed relationship with the flange 13c. The side plate 16 has an outer diameter which is slightly smaller than the diameter of the recessed portion 11b so that the side plate 16 is also located inside its associated recessed portion 11b when set in position. In the illustrated example, since the guide surface 13a is defined as a peripheral surface of a portion of the shaft 13 which has a larger diameter, the side plate 16 is set in position by bringing in contact with a step of such a larger diameter portion.

The thrust washer 15 is rotatably provided between one side of the ring 11 and the flange 13c and also between the opposite side of the ring 11 and the side plate 16. As shown in FIG. 4, the thrust washer 15 is formed with a plurality of substantially spherically shaped pockets 15a for reserving therein a quantity of lubricant. Thus, the thrust washer 15 is expected to provide a well lubricated contact between the ring 11 and the flange 13c and/or side plate 16, thereby preventing the bearing from becoming stuck due to heating.

However, in the prior art structure, since the contact surface between the ring 11 and the flange 13c or side plate 16 is relatively small so that the load per unit area is relatively large, there is still a danger that the bearing becomes stuck due to excessive heating particularly when the thrust load is relatively large and/or the rotating speed is relatively large. In addition, since the thrust washer 15 is provided with a plurality of substantially circular shaped pockets 15a, the actual contact between the ring 11 and the flange 13c or side plate 16 is reduced, which in turn increases the load per unit area. Moreover, difficulty is encountered in fabricating such a thrust washer 15. Besides, since the gap between the ring 11 and the flange 13c or side plate 16 must be set as small as possible from the viewpoint of preventing any foreign matter from sneaking in, such a condition makes it difficult to manufacture the bearing and thus tends to push up the cost. Finally, since the prior art structure basically relies on the sliding contact using the thrust washer 15, a relatively large torque is required and the thrust washer 15 becomes worn so that the thrust load-bearing characteristic may fluctuate. Thus, the prior art structure is not suited for high speed applications.

SUMMARY OF THE INVENTION

In accordance with the present invention, there is provided an improved stud type track roller bearing which generally includes a ring, a shaft having a flange at its one end, an annular side plate fitted onto and fixedly attached to the shaft in an opposed relationship with the flange, a plurality of rollers interposed between the shaft and the ring, and a retainer for retaining the rollers in position. In accordance with the principle of the present invention, the ring is in the form of a right or straight cylinder and thus includes an outer peripheral surface defined by rotating a straight line around the longitudinal axis of the ring, an inner peripheral surface also defined by rotating a straight line around the longitudinal axis of the ring, and a pair of straight end surfaces. The ring has an outer diameter which is larger than the diameter of each of the flange and the side plate. Each of the flange and the side plate has a flat annular surface in an opposed relationship with a corresponding one of the pair of end surfaces of the ring with a predetermined gap therebetween. An annular sliding member is located in sliding contact with each of the opposed surfaces of the ring and either of the flange and the side plate. In a preferred embodiment, the sliding member is a thrust washer which can absorb thrust generated between the ring and the shaft. Preferably, the thrust washer is comprised of a heat-resistant sliding material having a self-lubricating characteristic, including a thermoplastic high performance engineering plastic, such as PEEK. Use may also be made of polyacetals or polyamide. Preferably, the thrust washer has an outer diameter which is equal to or slightly smaller than the outer diameter of the flange. The thrust washer is, preferably, relatively thin and uniform in thickness.

In the preferred embodiment, sealing means is additionally provided to seal the gap between the ring and the flange and also between the ring and the side plate. In one embodiment, a holding groove is formed in an outer peripheral surface of each of the flange and the side plate for holding a seal member which seals the gap between the ring and the flange or side plate by keeping its fee end in sliding contact with the corresponding one of the end surfaces of the ring.

It is therefore an object of the present invention to provide an improved stud type track roller bearing having an increased load bearing capability for axial loads.

Another object of the present invention is to provide an improved stud type track roller bearing high in performance and smooth in operation.

A further object of the present invention is to provide an improved stud type track roller bearing simple in structure and easy and inexpensive to manufacture.

A still further object of the present invention is to provide an improved stud type track roller bearing capable of operating at high speeds and providing a prolonged service life.

Other objects, advantages and novel features of the present invention will become apparent from the following detailed description of the invention when considered in conjunction with the accompanying drawings.

DESCRIPTION OF THE PREFERRED EMBODIMENTS

Figure 1:
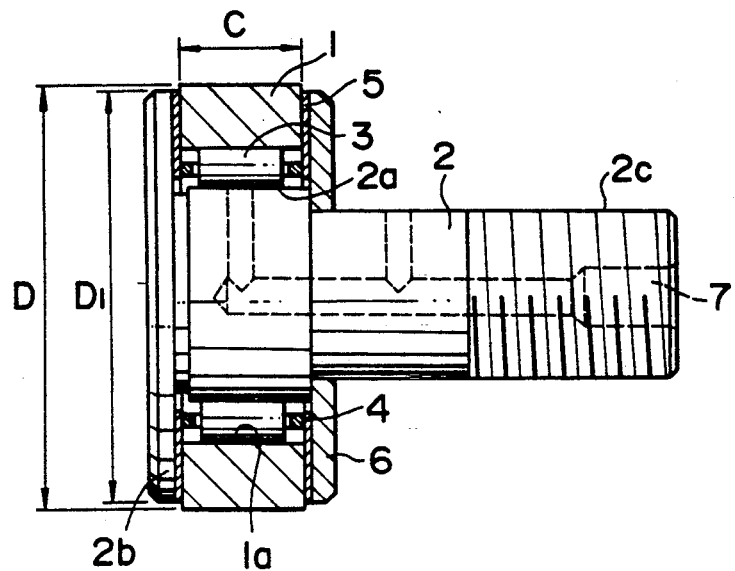
FIG. 1 is a schematic illustration showing partly in longitudinal cross section a stud type track roller bearing constructed in accordance with one embodiment of the present invention.

Referring now to FIG. 1, there is schematically shown a stud type track roller bearing constructed in accordance with one embodiment of the present invention. As shown, the present stud type track roller bearing generally includes a shaft or stud 2 having a flange 2b, a ring 1 fitted onto the shaft 2 with a gap therebetween, an annular side plate 6 tightly fitted onto the shaft 2 in an opposed relationship with the flange 2b, a plurality of rollers 3 as rolling members interposed between the shaft 2 and the ring 1, and a retainer 4 for retaining the rollers 3 in position.

In the illustrated embodiment, the shaft 2 includes a large diameter section 2a whose outer peripheral surface defines a circular roller guide surface, a flange 2b at its left end, and a threaded section 2c at its right end portion. The flange 2b defines a head of the shaft 2 and it has an outer diameter D1. In the illustrated embodiment, the threaded section 2c extends from the right end approximately halfway toward the large diameter section 2a.

The side plate 6 is located adjacent to a stepped portion of the large diameter section 2a and fixedly attached to the shaft 2, for example, through an interference fit. The side plate 6 may be welded or bolted to the shaft 2, if desired. The side plate 6 is preferably the same in diametrical size as the flange 2b and thus has an outer diameter equal to D1, though the outer diameter of the side plate 6 may have a different value.

In the illustrated embodiment, the ring 1 is constructed to be uniform in thickness to thereby define an inner peripheral guide surface 1a in an opposed relationship with the peripheral guide surface of the large diameter section 2a of the shaft 2. Thus, a guide channel is defined between these opposed peripheral guide surfaces 1a and 2a, and a plurality of rollers 3 are provided in this guide channel as spaced part from each other in a circumferential direction in rolling contact with both of these peripheral guide surfaces 1a and 2a. A retainer 4 for retaining the rollers 3 in position is also provided in the guide channel. Thus, the rollers 3 serve to sustain the load in the radial direction.

The ring 1 has an outer peripheral surface which is defined by rotating a parallel, straight line around the longitudinal axis of the shaft 2 so that the ring 1 has an outer diameter D which is slightly larger than the outer diameter D1 of the flange. In the illustrated embodiment, the ring 1 has a width C. The ring 1 also has a pair of flat and parallel end surfaces, each of which is located opposite to a corresponding one of flat surfaces of the flange 2b and the side plate 6 with a predetermined gap therebetween. That is, in the illustrated embodiment, the flange 2b has a flat annular surface formed thereon around the large diameter section 2a of the shaft 2 and this flat annular surface is located opposite to a left-hand end surface of the ring 1 with a predetermined gap therebetween. Similarly, the side plate 6 has an annular flat surface which is located in an opposed relationship with the right-hand end surface of the ring 1 with a predetermined gap therebetween. An annular sliding member 5 is provided in each of these gaps in sliding contact with a pair of opposed surfaces.

The sliding member 5 has an outer diameter which is equal to or slightly smaller than the outer diameter D1 of the flange 2b. Preferably, the sliding member 5 is relatively thin and uniform in thickness. In one embodiment the sliding member 5 is a thrust washer comprised of a heat-resistant material having a self-lubricating characteristic, including thermoplastic high performance engineering plastics, such as polyether-etherketone (PEEK). PEEK is a heat-resistant, anti-chemical and high strength material and it is also easy to work with. Alternatively, use may also be made of such a material as polyacetal (POM) or polyamide (PA), if desired.

With this structure, if a thrust force is applied to the ring 1 for some reason, for example, due to skewing of the rollers 3 because of the presence of mounting errors, such a thrust force can be conveniently sustained or absorbed by the sliding members 5. In this case, since a sliding contact is provided substantially across the entire end surface of the ring 1 on both ends with the flange 2b and the side plate 6 with sliding members 5 sandwiched therebetween, a thrust force per unit area is significantly reduced as compared with the prior art as described above, so that no problems arise even if the present bearing is operated at high speeds. In addition, since the sliding member 5 comprised of a heat-resistant material having a self-lubricating characteristic are provided in a gap between the ring 1 and the flange 2b and also in a gap between the ring 1 and the side plate 6, the possibility of occurrence of sticking due to excessive heating can be eliminated or significantly reduced.

It is to be noted that an internal path indicated by the dotted lines 7 in FIG. 1 is a path for distributing a lubricant to desired locations through the shaft 2.

Figure 2:
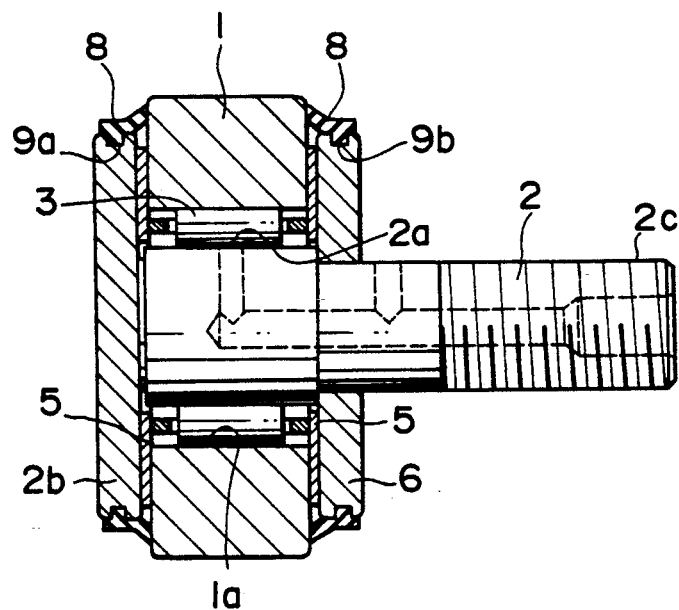
FIG. 2 is a schematic illustration showing partly in longitudinal cross section a modification of the stud type track roller bearing shown in FIG. 1.
Figure 3:
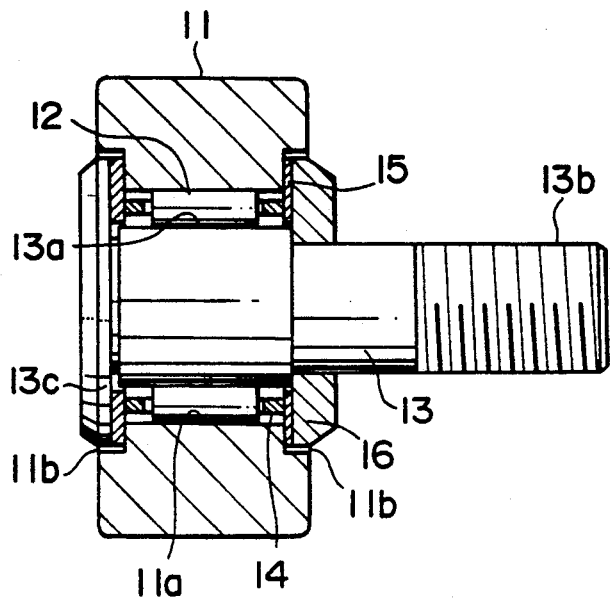
FIG. 3 is a schematic illustration showing partly in longitudinal cross section a typical prior art stud type track roller bearing.
Figure 4:
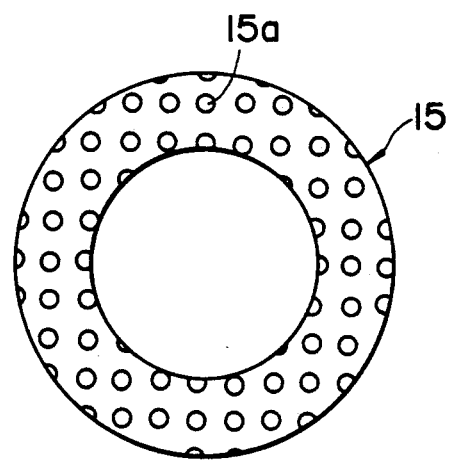
FIG. 4 is a schematic illustration showing in front view the thrust washer employed in the bearing shown in FIG.

FIG. 2 illustrates a modification of the stud type track roller bearing shown in FIG. 1. Since this modification is similar in many respects to the previous embodiment described above with reference to FIG. 1, like numeral are used to indicate like elements. The embodiment shown in FIG. 2 differs from the above-described embodiment only in the provision of seal means for sealing the gap between the ring 1 and the flange 2b and between the ring 1 and the side plate 6. That is, in the embodiment shown in FIG. 2, a holding groove 9a is formed in the outer peripheral surface of the flange 2b and similarly a holding groove 9b is formed in the outer peripheral surface of the side plate 6. A sealing member 8 preferably comprised of an elastic material, such as rubber, synthetic rubber, or plastics, is fixedly attached to each of the flange 2b and the side plate 6 by securement in the corresponding holding groove 9a or 9b. An adhesive agent may be used to secure the attachment of the sealing member 8, if desired. Or, any alternative or additional means for fixing the sealing member 8 to each of the flange 2b or side plate 6 may also be used. For example, a plurality of small holes may be provided in each of the flange 2b and the slide plate 6 and correspondingly a plurality of projections may be provided in the sealing member 8, in which case the sealing member 8 may be physically clamped to the flange 2b or side plate 6 by having the projections snugly fitted into the corresponding holes.

In the illustrated embodiment, the sealing member 8 has its base end fixedly attached to the flange 2b or side plate 6 and has its free end pressed against the end surface of the ring 1. Accordingly, the gap between the ring 1 and the flange 2b and also between the ring 1 and the side plate 6 is conveniently sealed at its outer periphery. Thus, no foreign matter, such as dust, is well prevented from entering into the gaps or the sliding contact surfaces between the ring 1 and each of the flange 2b and the side plate 6. This structure assures a prolonged service life as well as reliable operation.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A stud type track roller bearing, comprising:
   a shaft extending over a length and including a flange having a flat guide surface;
   an annular side plate fixedly attached to said shaft in an opposed relationship with said flange in an axial direction, said side plate having a flat guide surface;
   a ring fitted onto said shaft to define an annular gap therebetween, said ring having a pair of flat end surfaces, each of which is located in an opposed relationship with a corresponding one of said flat guide surfaces of said flange and said side plate with a predetermined gap therebetween;
   a plurality of rolling members provided in said annular gap in rolling contact with both of said ring and said shaft spaced apart from each other circumferentially;
   a sliding member provided in each of the gaps between said ring and said flange and between said ring and said side plate in sliding contact therewith; and
   sealing means for sealing said gaps between said ring and said flange and between said ring and said side plate, said sealing means including a sealing member having one end fixedly attached to said flange or side plate and the other end pressed against and in sliding contact with said ring.

2. The bearing of claim 1, wherein each of said flange and side plate is formed with a holding groove for holding said sealing member fixedly attached thereto.

* * * * *